United States Patent Office 2,877,153
Patented Mar. 10, 1959

2,877,153

FUNGICIDAL COMPOSITIONS

Irving D. Webb and John W. Yale, Jr., Yorba Linda, Calif., assignors, by mesne assignments, to Collier Carbon and Chemical Corporation, a corporation of California No Drawing. Application August 5, 1957
Serial No. 676,425

14 Claims. (Cl. 167—22)

This invention relates to compositions of matter useful for the control of pest organisms, especially soil-borne fungi, and in particular concerns fungicidal compositions comprising certain organic sulfides as the essential active ingredient.

The invention is based on our discovery that the products obtained by sulfurizing certain bis(alkylthiomethyl)-sulfides are highly toxic to a variety of fungi, particularly soil-borne fungi which are the cause of a variety of plant diseases. Such sulfurized products are substantially non-phytotoxic, and may hence be advantageously employed as active ingredients in fungicidal compositions of more or less conventional formulation and suitable for use on or in the vicinity of living plants.

The bis(alkylthiomethyl)sulfides which are reacted with sulfur to form the present fungitoxic products may be defined by the general formula:

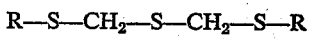
R—S—CH$_2$—S—CH$_2$—S—R wherein R represents an alkyl group containing from 1 to 3 carbon atoms, i. e., methyl, ethyl and propyl. Such compounds are preferably prepared by reaction between three moles of the corresponding alkyl thioformal and one mole of trithiane (thioformaldehyde trimer):

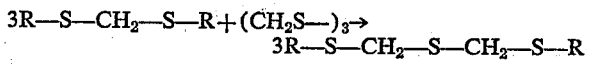
3R—S—CH$_2$—S—R+(CH$_2$S—)$_3$→
3R—S—CH$_2$—S—CH$_2$—S—R

The reaction is conveniently carried out under atmospheric pressure at a temperature between about 100° C. and about 200° C., preferably between about 125° C. and about 180° C., in the presence of a catalytic amount of a Friedel-Crafts type catalyst, e. g., zinc chloride. If desired, an inert liquid reaction medium, e. g., heptane, nitrobenzene, carbon bisulfide, etc. may be employed in the conventional manner. The reaction time varies with the reaction temperature, but is usually between about ½ and about 10 hours. Upon completion of the reaction, the product is filtered or washed with water to remove the catalyst, and is then fractionally distilled under vacuum to separate the bis(alkylthiomethyl)sulfide product from unreacted materials and by-products. If desired, the fractionation step may be omitted and the crude product employed directly in the sulfurization step described below. The present bis(alkylthiomethyl)sulfides may also be formed by a reaction which involves formation of the dialkylthioformal and trithiane reactants in situ, i. e., by reacting a 1–3 carbon atom alkyl mercaptan with formaldehyde and hydrogen sulfide.

The sulfurization reaction is carried out simply by heating a mixture of the crude or purified bis(alkylthiomethyl)sulfide and elemental sulfur under atmospheric or elevated pressure. Between about one and about 12 atomic weights of sulfur are employed per molecular weight of the bis(alkylthiomethyl)sulfide. The reaction temperature may be varied between about 100° C. and about 250° C., and is preferably between about 125° C. and about 200° C. The time required for completion of the reaction depends upon the reaction temperature as well as upon the proportions in which the reactants are employed, but is usually between about 1 and about 24 hours. If desired, the reaction time may be shortened by adding to the reaction mixture a catalytic amount of a Friedel-Crafts type catalyst such as zinc chloride. Also, if desired, the reaction may be carried out in the presence of an inert liquid reaction medium. Upon completion of the reaction, the sulfurized product can be used directly and without further purification in formulating the present fungicidal compositions. If desired, however, the product may be gas-stripped to remove volatile by-products and/or fractionally distilled into fractions containing varying amounts of combined sulfur. The amount of sulfur which is introduced into the bis(alkylthiomethyl)-sulfide reactants will depend upon the reaction temperature, the proportions in which the reactants are employed, and the catalyst concentration. By suitably controlling these variables, such amount can be varied from one to about ten atoms of sulfur per molecule of the bis(alkylthiomethyl)sulfide. If desired, an excess of sulfur may be provided and the unreacted sulfur separated from the sulfurized product by cooling the latter to, say, 0° C., and filtering off the unreacted sulfur which is thereby precipitated. The physical and biological properties of the sulfurized products vary somewhat with the amount of sulfur contained therein, and insofar as fungicidal activity and ease of formulation into simple fungicidal compositions are concerned it is preferable to employ the products containing an average of from about two to about six atoms of sulfur per molecule of the bis(alkylthiomethyl)sulfide.

To summarize the foregoing, the fungitoxic materials employed in preparing the compositions of the invention are sulfurized bis(alkylthiomethyl)sulfides obtained by reacting elemental sulfur with a bis(alkylthiomethyl)sulfide of the present class at a reaction temperature between about 100° C. and about 200° C. for a period of time between about 1 and about 24 hours, between about 1 and about 12 atomic weights of sulfur being employed per molecular weight of said sulfide and said conditions of time and temperature being sufficient to effect the formation of a sulfurized bis(alkylthiomethyl)sulfide containing from one to an average of about ten atoms of sulfur per molecule of said sulfide.

The following examples will illustrate the preparation of several members of the present class of fungicidal agents, but are not to be construed as limiting the invention. All proportions are given in parts by weight.

*Example I*

A mixture of 400 parts of dimethylthioformal, 65 parts of trithiane and 2 parts of zinc chloride are placed in a reaction vessel and heated with stirring at 140° C. for 2.5 hours. The reaction product is then cooled, washed with aqueous sodium bicarbonate, and dried over potassium carbonate. The dried product is then filtered and fractionally distilled under vacuum to recover bis(methylthiomethyl)sulfide as an oily liquid boiling at about 53° C. under 0.15 mm. pressure, and having an index of refraction of about 1.5795 and a density of about 1.16. Bis(ethylthiomethyl)sulfide and bis(propylthiomethyl)-sulfide are prepared in the same manner by substituting diethylthioformal and dipropylthioformal, respectively, for the dimethylthioformal reactant.

134 parts of the bis(methylthiomethyl)sulfide are admixed with 83.5 parts of elemental sulfur and 2 parts of mercuric chloride, and the mixture is heated at 140°–145° C. for 3 hours. The product so obtained is stored overnight at about 0° C., and is then filtered to remove a small amount of precipitated sulfur. It is then gas-stripped by blowing with dry nitrogen at room temperature under 0.1 mm. pressure. The product so obtained is an orange-colored oil whose analysis indicates it to have the empirical formula $C_4H_{10}S_6$.

*Example II*

A mixture of 154 parts of bis(methylthiomethyl)sulfide, 192 parts of sulfur, and 1 part of zinc chloride is heated at a temperature of about 150° C. for about one hour. The product so obtained is cooled, filtered to remove the zinc chloride, and stored overnight at −20° C. No free sulfur precipitates. The product so obtained is a dark viscous liquid having a density of about 1.495, and an index of refraction of about 1.695. It is miscible with benzene and insoluble in acetone, and its analysis indicates it to have the empirical formula $C_4H_{10}S_9$, indicating that 6 atoms of sulfur have been introduced into the bis(methylthiomethyl)sulfide molecule. Similar products are obtained when the procedure is repeated employing bis(ethylthiomethyl)sulfide and bis(propylthiomethyl)sulfide instead of bis(methylthiomethyl)sulfide. By appropriately increasing the proportion of sulfur and raising the reaction temperature or lengthening the reaction time, as many as 10 atoms of sulfur can be introduced into the bis(alkylthiomethyl)sulfide molecule.

The fungicidal compositions provided by the invention essentially comprises one or a mixture of the sulfurized compounds described above and an inert fungicidal carrier material. The latter may be either a liquid or a solid or a combination of both. When the composition is to take the form of a liquid spray or dip, the inert carrier material is usually water, and the active ingredient is maintained dispersed or suspended therein with the aid of an organic dispersing agent. Any of the dispersing agents commonly employed in formulating aqueous pesticidal compositions may be employed. Alternatively the sulfurized bis(alkylthiomethyl)sulfide may be mixed with an inert solid carrier material such as talc, diatomaceous earth, aluminum silicate, etc., to form dry compositions which can be employed directly as dusting fungicides or which can be dispersed in an aqueous or oleaginous medium to form a liquid spray. In general, any of the conventional formulation and application techniques may be followed in employing the present sulfurized products in fungicidal compositions, and any of the wetting agents, spreaders, sticking agents, diluents, carrier materials, etc., which are conventionally employed in formulating pest control compositions may be used in combination with the present fungitoxic products.

The sulfurized bis(alkylthiomethyl)sulfide toxicants of the present class are effective in relatively small quantities, and in the enterests of economy they are usually employed in concentrations of the order of 50–4000 parts per million. Liquid concentrate compositions which are adapted to be diluted to such concentrations before use usually contain between about 1 and about 15 percent by weight of the active ingredient and sufficient of an emulsifying or dispersing agent to maintain the active ingredient uniformly suspended in the liquid carrier material. Solid concentrate compositions usually contain between about 5 and about 50 percent by weight of the active ingredient and, optionally, small amounts of dispersing agents, spreading agents, and other conventional adjuvants.

The following examples will illustrate the formulation of a number of fungicidal compositions within the scope of the invention. The abbreviations "BMTMS·$S_x$," "BETMS·$S_x$" and "BPTMS·$S_x$" refer to sulfurized bis(methylthiomethyl)sulfide, bis(ethylthiomethyl)sulfide, and bis(propylthiomethyl)sulfide, respectively, with "$x$" representing the average number of sulfur atoms which have been introduced into the bis(alkylthiomethyl)sulfide molecule.

*Example III*

| | Lbs. |
|---|---|
| BETMS·$S_3$ | 2.0 |
| Attapulgus clay | 2.5 |
| Aluminum silicate | 40.0 |
| Powdered blood albumen | 0.2 |

The ingredients are thoroughly admixed in a ball mill to obtain a fungicidal dusting composition suitable for direct application to plants.

*Example IV*

| | Lbs. |
|---|---|
| BMTMS·$S_1$ | 2.5 |
| Water | 50.0 |
| Powdered blood albumen | 0.25 |

The sulfurized product and blood albumen are added to the water, and the mixture is passed through a colloid mill or high speed blender to obtain a concentrate composition which can be diluted 1000:1 with water to form a spray for application either to plants or to fungus infested soil.

*Example V*

| | Lbs. |
|---|---|
| BPTMS·$S_7$ | 0.5 |
| Benzene | 5.0 |
| Non-phytotoxic spray oil | 4000.0 |

This composition is useful as a tree spray.

*Example VI*

| | Lbs. |
|---|---|
| BMTMS·$S_{10}$ | 10.0 |
| Kerosene extract oil | 150.0 |

This composition may be employed for treating lumber.

*Example VII*

| | Lbs. |
|---|---|
| BETMS·$S_6$ | 2.5 |
| Water | 50.0 |
| Commercial sticking agent | 0.5 |
| Commercial spreading agent | 0.5 |

The ingredients are admixed in a colloid mill, and are thereafter diluted with 250 gallons of water to obtain a spray composition containing about 250 parts per million of the active ingredient.

*Example VIII*

| | Lbs. |
|---|---|
| BPTMS·$S_3$ | 0.5 |
| Benzene | 0.1 |
| Non-ionic dispersing agent | 0.2 |
| Water | 500.0 |

The active incredient is dissolved in the benzene, and the dispersing agent is admixed with the water. The two solutions are then combined and passed through a homogenizer to obtain a spray composition.

*Example IX*

| | Lbs. |
|---|---|
| BMTMS·$S_{4.5}$ | 2.0 |
| Walnut shell flour | 40.0 |
| Petroleum sulfonates | 0.3 |

The ingredients are admixed in a ball mill to obtain a dry concentrate composition which can subsequently be dispersed in water to form a spray.

*Example X*

| | Lbs. |
|---|---|
| Active ingredient | 10.0 |
| Attapulgus clay | 30.0 |
| "Neoterge" wetting agent | 0.12 |
| "Dupanol ME" wetting agent | 0.05 |
| Lignin sulfate suspending agent | 0.12 |

The ingredients are thoroughly admixed by grinding together in a mortar to form a wettable powder which is employed in demonstrating the pesticidal activity of the present class of sulfurized mercaptal. In carrying out in vitro tests on fungi, a 10-gram sample of the composition is added to enough distilled water to make 100 grams, and the mixture is homogenized for three minutes in a high-speed blender. With the blender still operating, 3 grams of liquid are removed therefrom and are stirred into 750 grams of liquid potato dextrose agar at 45° C. and the agar is transferred to a Petri dish. The agar so prepared contains 100 p. p. m. of the active ingredient. The agar is then allowed to cool and solidify, and a ¼″ disc of the test fungus is placed on the surface of the agar. The inoculated agar is incubated for two days, after which the extent of the fungus growth is measured and the extent of inhibition of fungus growth is calculated as follows:

Percent Inhibition = $\frac{\text{Growth on Test Sample}}{\text{Growth on blank}} \times 100$ The following tabulation present inhibition values obtained by subjecting BMTMS·S$_6$ together with the unsulfurized BMTMS, to the foregoing test procedure employing a variety of test organisms.

| Organism | Percent Inhibition | |
|---|---|---|
| | BMTMS·S$_6$ | BMTMS |
| F. roseum | 79.6 | 28.5 |
| P. ultimum | 100.0 | 48.5 |
| S. sclerotiorum | 100.0 | 62.7 |
| B. cinerea | 87.5 | 35.2 |
| A. solani | 100.0 | 55.0 |
| Average for all organisms | 93.4 | 45.9 |

In tests carried out in the greenhouse with living plants, the aforementioned wettable powder composition is suspended in water to form a liquid composition containing the desired concentration of the active ingredient. Samples of soil which is infested with the test organism are then treated with the liquid composition, and seeds of the test plant are sowed in the soil samples. The planted samples are maintained under greenhouse conditions for a period of time which depends upon the particular test plant employed, after which they are examined and compared with blank plant specimens which have been grown in untreated soil. By means of such test procedure it has been found that at a concentration of 200 p. p. m. BMTM·S$_3$ provided 100% control of Rhizoctonia solani on cotton plants. BMTM·S$_6$ was similarly found to provide 95% control of Rhizoctonia. In foliage tests, wherein the foliage of the test plant is sprayed with the test composition and thereafter sprayed with spores of the test organism, BMTM·S$_3$ was found to provide 95–100% control of Septoria blight on tomato plants at a concentration of 2500 p. p. m. BMTM·S$_6$ was similarly found to provide 95–100% control of Septoria on tomato plants, and 95–100% control of Alternaria solani on tomato plants. In contrast, unsulfurized BMTM provided very poor control of these fungi-induced diseases.

Other modes of applying the principle of our invention may be employed instead of those explained, change being made as regards the methods or materials employed, provided the products or steps stated by any of the following claims, or the equivalent of such stated products or steps, be obtained or employed.

We, therefore, particularly point out and distinctly claim as our invention:

1. A fungicidal composition comprising an inert fungicidal carrier material and, as the essential active ingredient, a product obtained by heating a bis(alkylthiomethyl)sulfide of the general formula:

R—S—CH$_2$—S—CH$_2$—S—R wherein R represents an alkyl group containing from 1 to 3, inclusive, carbon atoms, with elemental sulfur at a temperature between about 100° C. and about 250° C. for a period of time between about 1 and about 24 hours, at least about one atomic weight of sulfur being employed per molecular weight of said bis(alkylthiomethyl)sulfide and said conditions of time and temperature being sufficient to effect the formation of a sulfurized bis-(alkylthiomethyl)sulfide product containing between about 1 and about 10 atoms of sulfur per mole of said bis(alkylthiomethyl)sulfide.

2. A composition as defined by claim 1 wherein said bis(alkylthiomethyl)sulfide is bis(methylthiomethyl)sulfide.

3. A composition as defined by claim 1 wherein the said carrier material comprises a particulate inorganic solid.

4. A composition as defined by claim 1 wherein the said carrier material comprises water and sufficient of a dispersing agent to maintain said active ingredient uniformly dispersed in said water.

5. A composition as defined by claim 1 wherein the said sulfurized bis(alkylthiomethyl)sulfide contains between about 2 and about 6 atoms of sulfur per molecule of said bis(alkylthiomethyl)sulfide.

6. The method of controlling the growth of fungi on plants which comprises applying thereto a toxic amount of a composition as defined by claim 1.

7. The method of controlling the growth of soil-borne fungi which comprises admixing with soil infested with said fungi a fungitoxic amount of a composition as defined by claim 1.

8. A fungicidal composition comprising an inert fungicidal carrier material and, as the essential active ingredient, a product obtained by heating a bis(alkylthiomethyl)-sulfide of the general formula:

R—S—CH$_2$—S—CH$_2$—S—R wherein R represents an alkyl group containing from 1 to 3, inclusive, carbon atoms, with elemental sulfur at a temperature between about 125° C. and about 200° C. for a period of time between about 1 and about 24 hours, and thereafter separating from the product so obtained any unreacted sulfur, at least about 2 atomic weights of sulfur being employed per molecular weight of said bis(alkylthiomethyl)sulfide and said conditions of time and temperature being sufficient to effect the formation of a sulfurized bis(alkylthiomethyl)sulfide product containing from between about 2 to about 6 atoms of sulfur per molecule of said bis(alkylthiomethyl)sulfide.

9. A composition as defined by claim 8 wherein the said bis(alkylthiomethyl)sulfide is bis(methylthiomethyl)-sulfide.

10. A composition as defined by claim 8 wherein the said carrier material is a particulate inorganic solid.

11. A composition as defined by claim 8 wherein the said carrier material comprises water and sufficient of a dispersing agent to maintain said active ingredient uniformly dispersed in said water.

12. A composition of matter adapted to being diluted to form a fungicide, said composition comprising water, between about 1 and about 15 percent by weight of a fungicidally active product obtained as defined in claim 8, and sufficient of a dispersing agent to maintain said fungicidally active product uniformly dispersed in said water.

13. A composition of matter adapted to being dispersed in water to form a fungicide, said composition comprising an inert particulate inorganic fungicidal carrier material, between about 5 and about 50 percent by weight of a fungicidally active product obtained as defined in claim 8, and sufficient of a dispersing agent to maintain said carrier material and said fungicidally active product uniformly dispersed in said water.

14. The method of controlling the growth of fungi on plants which comprises applying thereto a toxic amount of a composition as defined by claim 8.

No references cited.